United States Patent
Malladi et al.

(10) Patent No.: US 7,493,132 B2
(45) Date of Patent: Feb. 17, 2009

(54) SYSTEM AND METHOD FOR UPLINK RATE SELECTION

(75) Inventors: Durga Prasad Malladi, San Diego, CA (US); Serge Willenegger, Onnens (CH); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 876 days.

(21) Appl. No.: 10/367,498

(22) Filed: Feb. 14, 2003

(65) Prior Publication Data

US 2006/0105796 A1    May 18, 2006

(51) Int. Cl.
*H04B 7/00* (2006.01)

(52) U.S. Cl. .................. 455/522; 455/69; 455/442; 370/318

(58) Field of Classification Search .......... 455/522, 455/127.1, 69, 127.5, 13.4, 70, 450, 509, 455/436–442; 370/318
See application file for complete search history.

(56) References Cited

U.S. PATENT DOCUMENTS

| 5,056,109 | A | 10/1991 | Gilhousen et al. |
| 5,265,119 | A | 11/1993 | Gilhousen et al. |
| 5,903,554 | A | 5/1999 | Saints |
| 6,097,972 | A | 8/2000 | Saints et al. |
| 6,351,650 | B1 * | 2/2002 | Lundby et al. .......... 455/522 |
| 6,603,748 | B1 * | 8/2003 | Lu et al. .............. 370/329 |
| 7,174,179 | B2 * | 2/2007 | Krebs et al. ........... 455/504 |
| 2002/0137457 | A1 * | 9/2002 | Nivens et al. .......... 455/13.4 |
| 2004/0219920 | A1 * | 11/2004 | Love et al. ............ 455/442 |

FOREIGN PATENT DOCUMENTS

| WO | 0103357 | 1/2001 |
| WO | 0124568 | 4/2001 |
| WO | 0245291 | 6/2002 |

OTHER PUBLICATIONS

International Search Report—PCT/US2004/004671—International Search Authority—European Patent Office—Jun. 28, 2004.

* cited by examiner

*Primary Examiner*—Edward Urban
*Assistant Examiner*—Raymond S Dean
(74) *Attorney, Agent, or Firm*—Albert J. Harnois, Jr.; Dang M. Vo; Thomas R. Rouse

(57) ABSTRACT

Techniques are provided herein to mitigate the effects of link imbalance for the uplink between a terminal (or UE) and multiple base stations (or Node Bs). An uplink transmission rate is selected based on an adjusted nominal uplink transmission rate and the difference between power control commands from different nodes.

23 Claims, 5 Drawing Sheets

SYSTEM AND METHOD FOR UPLINK RATE SELECTION

BACKGROUND

1. Field

The present invention relates generally to data communication, and more specifically to techniques for uplink rate selection in a wireless communication system.

2. Background

Wireless communication systems are widely deployed to provide various services such as voice, packet data, and so on. These systems may be multiple-access systems capable of supporting communication with multiple users, and may be based on code division multiple access (CDMA), time division multiple access (TDMA), frequency division multiple access (FDMA), or some other multiple access techniques. CDMA systems may provide certain advantages over other types of system, including increased system capacity.

To improve reliability, a terminal may concurrently communicate with multiple base stations via a process often referred to as soft handover. Soft handover is typically supported for certain services (e.g., voice), but is often not supported for packet data on the downlink. This is because additional core resources would be required to support soft handover on the downlink. Moreover, packet data service can tolerate longer delays, which then allows for implementation of a retransmission scheme. For packet data transmission on the downlink, one of the base stations with which the terminal is in communication may be designated as a "serving" base station (also called a scheduling base station), and only this base station transmits packet data to the terminal. The serving base station is the base station with the best downlink. Data packets received in error by the terminal (i.e., erased packets) may be identified via feedback information sent to the base station, which can then retransmit these erased packets.

To maximize system capacity, on the uplink in a CDMA system, the transmit power of each terminal is controlled by a power control loop such that the signal-to-noise-and-interference ratio (SNR) of an uplink transmission, as received at the base station, is maintained at a target SNR. This target SNR is often referred to as the setpoint. While in soft handover, the uplink transmit power of each terminal is typically adjusted based on an "OR-of-the-Down" rule whereby the terminal decreases its transmit power if any base station requests a decrease. The terminal increases its transmit power if all base stations request an increase.

In certain instances, the base station with the best uplink for the terminal is not the serving base station. This phenomenon, which is referred to as link imbalance, may have a detrimental impact on out-of-cell interference in each cell. A base station and/or its coverage area are often referred to as a cell, depending on the context in which the term is used.

If link imbalance exists, then the uplink transmit power of the terminal would be adjusted based on the received SNR at the base station with the best uplink. However, the base station with the best uplink is not the base station transmitting packet data to the terminal and receiving feedback information from the terminal. The serving base station is the base station that is transmitting packet data to the terminal and receiving feedback information from the terminal.

If the link imbalance is sufficiently great, then the out-of-cell interference in each cell may have a detrimental effect on the reliability of the uplink. There is therefore a need in the art for techniques to mitigate out-of-cell interference in each cell.

SUMMARY

Techniques are provided herein to mitigate the effects of link imbalance for the uplink between a terminal (or UE) and multiple base stations (or Node Bs). An uplink transmission rate is selected based on an adjusted nominal uplink transmission rate and the difference between power control commands from different nodes.

In an aspect, a method of selecting an uplink transmission rate in a wireless communications system, comprises: receiving a nominal uplink transmission rate, determining a difference value based on a first set of power control commands and a second set of power control commands, and selecting an uplink transmission rate based on the nominal uplink transmission rate and the difference value. In an aspect, the length of the first set of power control commands and the length of the second set of power control commands is n.

In an aspect, the first set of power control commands is from a serving node and a second set of power control commands is from a node having a best uplink transmission signal-to-noise-and-interference ratio (SNR). In an aspect, the difference value is determined by: assigning a power control value to each power control command in the first set of power control commands and assigning a power control value to each power control command in the second set of power control commands; summing the power control values of the first set of power control values, creating a first sum; summing the power control values of the second set of power control values, creating a second sum; and calculating the difference between the first sum and the second sum. In an aspect, the difference between the first sum and the second sum is translated into a difference gain value.

In an aspect, a terminal in a wireless communications system, comprises means for receiving a nominal uplink transmission rate, means for determining a difference value based on a first set of power control commands and a second set of power control commands, and means for selecting an uplink transmission rate based on the nominal uplink transmission rate and the difference value.

Various aspects and embodiments of the invention are described in further detail below. The invention further provides methods, program codes, digital signal processors, receiver units, transmitter units, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
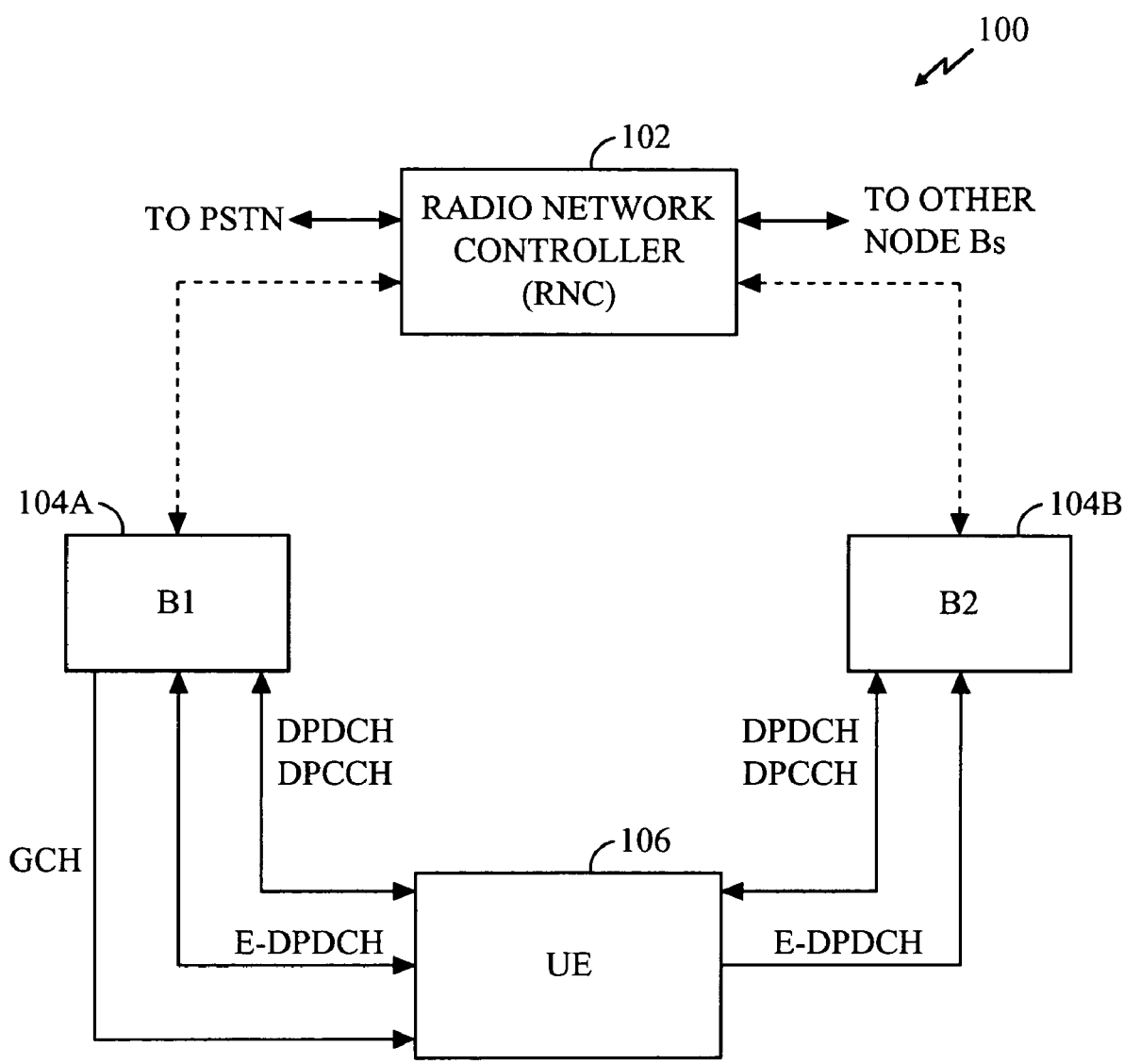
FIG. 1 is a diagram of a wireless communication system in accordance with an embodiment.

FIG. 1 is a diagram of a wireless communication system 100 that may implement various embodiments. System 100 includes a number of base stations 104 that provide coverage for a particular geographic area. For simplicity, only two base stations are shown in FIG. 1. A base station is also referred to as a Node B, a base transceiver system (BTS), an access point, or some other terminology known to one skilled in the art. In an embodiment, the base stations are part of a Universal Mobile Telecommunication System (UMTS) Radio Access Network (UTRAN).

Various terminals 106 are typically dispersed throughout the system. For simplicity, only one terminal is shown in FIG. 1. A terminal is also referred to as user equipment (UE), a mobile station, an access terminal, or some other terminology known to one skilled in the art. Each terminal may communicate with one or more base stations on the downlink and/or uplink at any given moment, depending on whether or not the terminal is active, whether or not soft handover is supported for the data transmission, and whether or not it is in soft handover. The downlink (i.e., forward link) refers to transmission from the base station to the terminal, and the uplink (i.e., reverse link) refers to transmission from the terminal to the base station.

A system controller 102 couples to base stations 104 and may further couple to a public switched telephone network (PSTN) and/or one or more packet data networks (PDNs). System controller 102 is also referred to as a radio network controller (RNC), a base station controller (BSC), or some other terminology known to one skilled in the art. System controller 102 provides coordination and control for the base stations coupled to it. System controller 102 further controls the routing of calls (1) among terminals 106, and (2) between terminals 106 and other users coupled to the PSTN (e.g., conventional telephones) and PDNs, via base stations 104.

The techniques described herein may be implemented in various wireless communication systems. System 100 may be a code division multiple access (CDMA), time division multiple access (TDMA), or frequency division multiple access (FDMA) communication system. As a CDMA system, system 100 may be designed to implement one or more commonly known CDMA standards such as W-CDMA, IS-95, IS-2000, IS-856, and others. For clarity, various aspects, embodiments, and implementation details are described below for a W-CDMA system. Using W-CDMA terminology, the base station, terminal, and system controller are respectively referred to as Node B, UE, and RNC in the following description.

In W-CDMA, data to be transmitted to a particular UE is processed as one or more transport channels at an upper layer. The transport channels are then mapped to one or more physical channels (at a physical layer) assigned to the UE. A physical channel is defined by various parameters including (1) a specific carrier frequency, (2) a specific scrambling code used to spectrally spread the data prior to transmission, (3) one or more channelization codes (if needed) used to channelize the data so that it is orthogonal to the data channelized by other codes, (4) specific start and stop times (defining a duration), and (4) on the uplink, a relative phase (0 or $\pi/2$). These various physical channel parameters are described in detail in W-CDMA standard documents.

The following transport and physical channels defined by W-CDMA are referred to herein:

| | |
|---|---|
| CPICH | common pilot channel |
| DPDCH | dedicated physical data channel |
| E-DPDCH | enhanced dedicated physical data channel |
| DPCCH | dedicated physical control channel |
| DPCH | dedicated physical channel (includes the DPDCH and DPCCH) |
| HS-DSCH | high-speed downlink shared channel |
| HS-SCCH | shared control physical channel for the HS-DSCH |
| HS-PDSCH | high-speed physical downlink shared channel |
| HS-DPCCH | high-speed dedicated physical control channel (uplink) |
| GCH | grant channel (downlink) |

Release 5 of W-CDMA supports high-speed downlink packet access (HSDPA), which is a set of physical channels and procedures defined as part of the UTRAN that enable high-speed transmission of data on the downlink. Data for HSDPA is processed in transport blocks (or packets), each of which spans a time interval referred to as transmission time interval (TTI). The transport blocks are then multiplexed onto the high-speed downlink shared channel (HS-DSCH), which is a downlink transport channel that may be shared by multiple UEs. The HS-DSCH is then mapped to a high-speed physical downlink shared channel (HS-PDSCH).

The channel structure for HSDPA thus includes a single high-speed downlink physical channel (HS-PDSCH) that may be used to transmit data in a time and code division multiplexed (TDM/CDM) manner for multiple UEs. The signaling for the HS-PDSCH, which includes various parameters used to properly receive the HS-PDSCH, is transmitted on an associated HS-SCCH. The HSDPA channel structure also includes a feedback mechanism for the UEs to report correctly and incorrectly received (i.e., erased) data packets. This feedback mechanism is referred to as Hybrid ARQ (HARQ) mechanism, and it enables the Node-B to know whether or not a packet has been received correctly by the UE. If the Node-B receives a negative acknowledgment (NAK), then it retransmits the erased packet.

Each UE receiving HSDPA is also assigned a downlink DPCH and an uplink DPCH. The downlink DPCH is used to transmit user-specific data and signaling from the Node B to the UE. The uplink DPCH is used to transmit user-specific data and signaling from the UE to the Node B. Each UE receiving HSDPA also transmits feedback information on the uplink HS-DPCCH for the data transmission received on the downlink via the HS-PDSCH.

Referring back to FIG. 1, the UE may be in soft handover (SHO) with multiple Node Bs on the uplink for the DPCH. Soft handover is a process whereby multiple transmissions are received and processed to increase the reliability of a data transmission. For the downlink, data is transmitted from multiple Node Bs to the UE, which can either (1) combine the symbols for multiple received transmissions and decode the combined symbols, or (2) independently decode the symbols for multiple received transmissions and select the best decoded result. For the uplink, the data transmission from the UE is received by multiple Node Bs and processed to provide the decoded result. For the uplink, each Node B typically independently decodes the symbols for its received transmission and provides the decoded result to the RNC for combining/selection.

HSDPA does not support soft handover with multiple Node Bs on the downlink for the HS-DSCH. For HSDPA, only one Node B in the UE's active set is designated as the serving Node B for HSDPA (or simply, the serving Node B). The active set includes a list of Node Bs with which the UE currently communicates. The UE receives an HSDPA transmission from only the serving Node B, as shown in FIG. 1, since soft handovers is not supported on the downlink. Scheduled transmissions from the UE are scheduled by the serving base station. The scheduled transmission take place on the enhanced DPDCH (E-DPDCH). In an embodiment, a scheduling message is transmitted on a grant channel (GCH) on the downlink.

The other Node Bs in the UE's active set are typically not even aware of the HSDPA transmission by the serving Node B. The feedback information reported on the uplink HS-DPCCH by the UE for the HSDPA transmission is thus directed to the serving Node B, and not the other Node Bs.

As used herein, link imbalance is a phenomenon whereby the serving Node B is not the one with the best uplink for the UE. Link imbalance exists when the best downlink and uplink are different. This phenomenon may occur for a number of reasons. A common reason for the serving Node B not having the best uplink is because of handoff delays. The RNC evaluates the received downlink SNR of all Node Bs in the UE's active set and then sends a handoff direction message to the UE. This process may involve large delays. Another reason is that a true physical imbalance may exist wherein the uplink corresponding to HSDPA downlink, becomes weaker than another uplink.

When the serving Node B is different from the Node B to which the UE has the best uplink, a scenario is created whereby the uplink to the serving Node B may no longer be reliable. Link imbalance may have a detrimental impact on performance for HSDPA transmission because the feedback information from the UE may not be reliably received by the serving Node B. The impact to performance resulting from link imbalance is described below.

As shown in FIG. 1, an HSDPA-capable UE is in uplink soft handover between two Node Bs, B1 and B2. The uplink DPDCH (i.e., the data portion of the uplink DPCH) is received by both Node Bs. Each Node B independently processes the received uplink DPDCH and provides decoded results to the RNC. The RNC receives and combines the decoded results from both Node Bs, determines the block error rate (BLER) of the uplink transmission on the DPCH, and provides a setpoint to both Node Bs. The setpoint is a particular target received signal quality deemed to be needed to achieve a particular target BLER. The setpoint may be quantified by a particular signal-to-noise-and-interference ratio (SNR) or some other measurement. The setpoint is adjusted higher if the actual BLER is higher than the target BLER, and is adjusted lower if the actual BLER is lower than the target BLER. The mechanism that adjusts the setpoint based on BLER is often referred to as an outer power control loop.

The setpoint is used by each Node B to adjust the uplink transmit power of the UE. In particular, if the received SNR at a particular Node B is lower than the setpoint, then an UP command may be transmitted to the UE to request an increase in transmit power. Conversely, if the received SNR is greater than the setpoint, then a DOWN command may be transmitted to the UE to request a decrease in transmit power. The UE receives the commands from all Node Bs and implements an "OR-of-the-DOWN" rule whereby it reduces the uplink transmit power if any Node B requests a decrease. The UE increases the uplink transmit power if all base stations request an increase. The mechanism that adjusts the transmit power of the UE based on the received SNR is often referred to as an inner power control loop.

For this example, the serving Node B is B1 but the uplink is better from the UE to the second Node B2. The RNC maintains the same uplink setpoint for the outer loop for both Node Bs, as long as the target BLER target for the DPDCH is met. Each Node B in the UE's active set determines the received SNR of the uplink transmission from the UE. This uplink received SNR may be estimated based on a pilot transmitted by the UE.

In an embodiment, the uplink pilot is located within the DPCCH and is power controlled by Node B1 and Node B2. The uplink DPDCH transmission is controlled by the RNC, and the uplink pilot set-point is determined by the DPDCH BLER.

Since the uplink to Node B2 is better than the uplink to Node B1, the received SNR for the uplink transmission received at Node B1 would be lower than the received SNR at Node B2. To simplify the example and for the sake of illustration, it is assumed that a received SNR is never exactly equal to the setpoint. With such an assumption, there are three scenarios that may exist with respect to the setpoint: (1) Both Node B1 and Node B2 SNRs are above the setpoint; (2) Both Node B1 and Node B2 SNRs are below the setpoint; and (3) Node B2 SNR is above the setpoint and Node B1 SNR is below the setpoint.

If both Node B1 and Node B2 SNRs are above the setpoint, both Node B1 and Node B2 would send a DOWN command to request the UE to decrease its uplink transmit power. Then, the UE implementing the OR-of-the-DOWN rule would reduce the uplink transmit power because of either the DOWN command received from Node B1 or the DOWN command from Node B2.

If both Node B1 and Node B2 SNRs are below the setpoint, both Node B1 and Node B2 would send UP commands to request the UE to increase its uplink transmit power. Then, the UE would increase the uplink transmit power since all base stations request an increase.

If Node B2 SNR is above the setpoint and Node B1 SNR is below the setpoint, Node B2 would send a DOWN command to request the UE to decrease its transmit power and Node B1 would send an UP command to request the UE to increase its uplink transmit power. Then, the UE implementing the OR-of-the-DOWN rule would reduce the uplink transmit power because of the DOWN command received from Node B2. Thus, the uplink transmit power would be decreased even though Node B1's SNR is below the setpoint, which may cause a further decrease of the Node B1 SNR below the setpoint.

It would be apparent to those skilled in the art, how to modify the uplink power control to take into account the case where a received SNR is exactly equal to the setpoint.

Figure 2A:
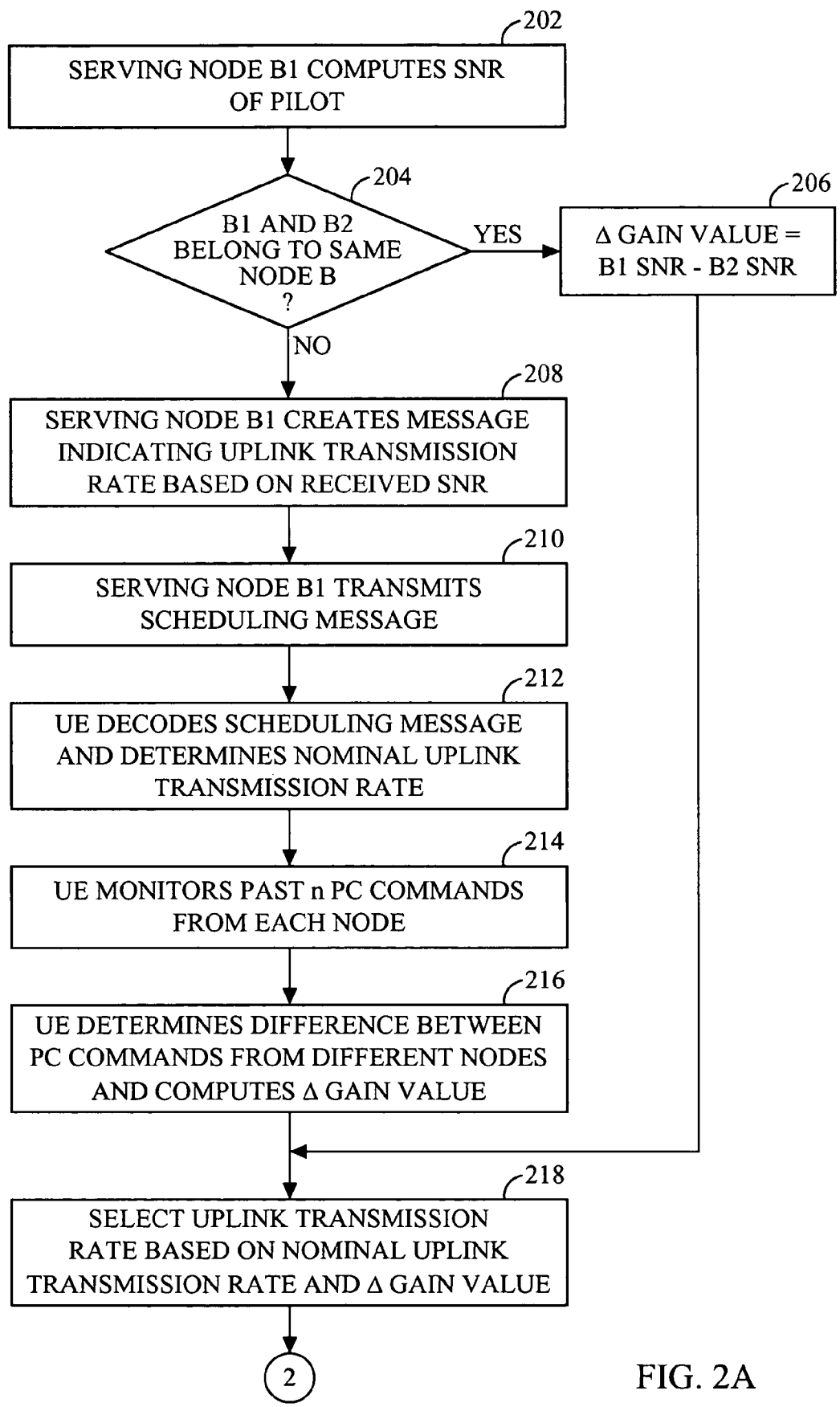
FIG. 2 show as FIGS. 2A and 2B, is a flow diagram of a process to select an uplink transmission rate in accordance with an embodiment.
Figure 2B:
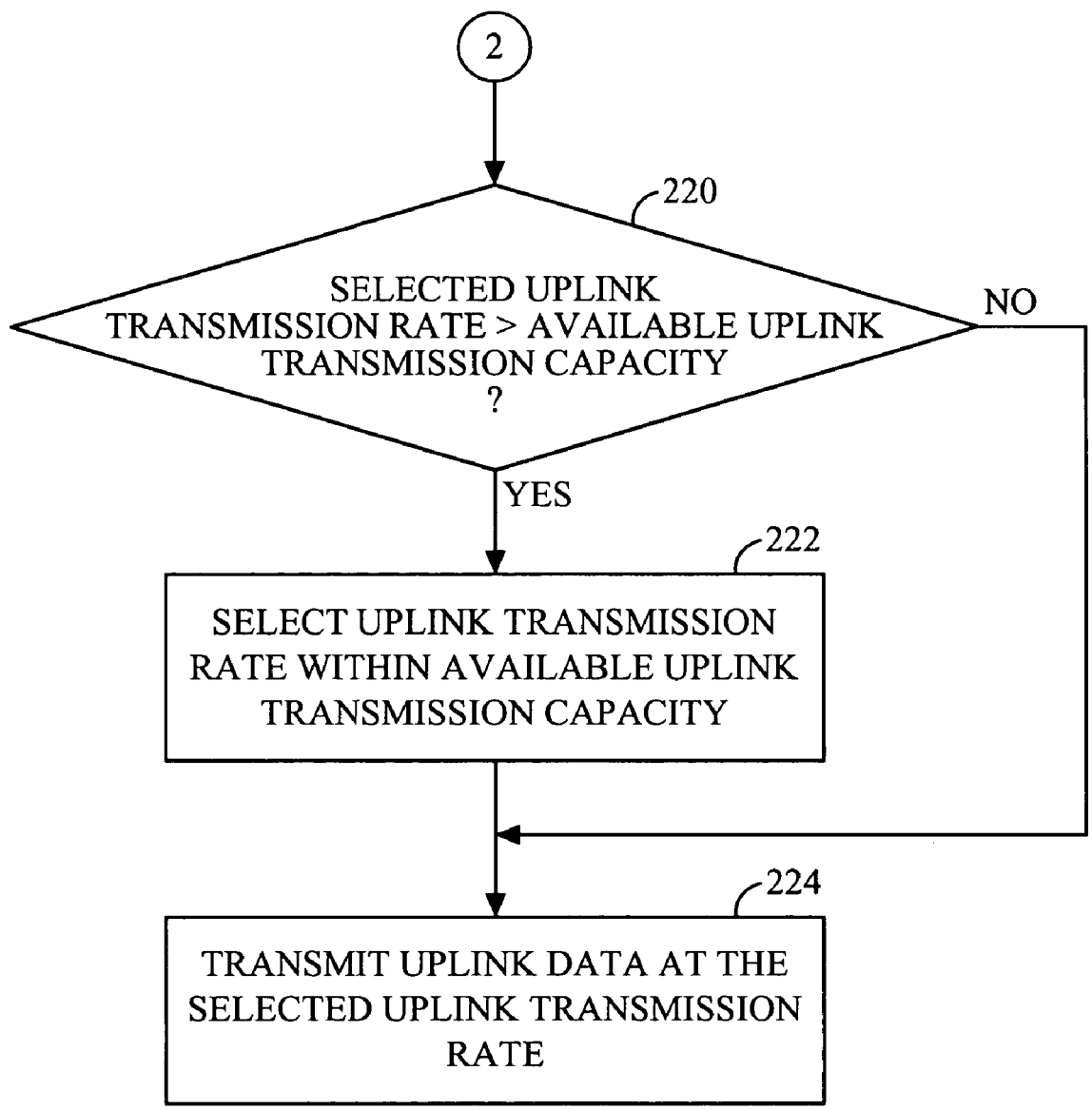

FIG. 2 is a flow diagram of a process to select an uplink transmission rate in accordance with an embodiment. In an embodiment, B1 and B2 could be cells within the same Node-B (or in 3GPP2 parlance, two sectors within the same BTS), in which case the UE is deemed to be in softer handover.

In step 202, a serving Node B1 computes the SNR of a received pilot transmission. In an embodiment, an indication of the received pilot is received on the downlink DPCCH and intended to command the pilot transmit power of the uplink DPCCH. It would be apparent to those skilled in the art that in another embodiment the received pilot transmission may be received on another channel from the UE.

In step 204, if B1 and B2 belong to the same Node B, then Node B has the pilot SNR at B2 and the flow of control goes to step 206, otherwise the flow of control goes to step 208. In step 206, the SNR difference between B1 and B2 is computed.

In step 208, Node B1 assumes that the received pilot SNR at all other cells (not from the same Node B as B1) is the same as seen at Node B1; therefore, Node B1 creates a scheduling message indicating an uplink transmission rate based on the received pilot SNR. In step 210, Node B1 schedules an uplink transmission. In an embodiment, the scheduling message is transmitted on a grant channel (GCH) on the downlink. In an embodiment, the uplink transmission occurs on the E-DP-DCH. The flow of control goes to step 212.

In step 212, the UE decodes the scheduling message and determines an assigned scheduled uplink rate. In an embodiment, the assigned scheduled uplink rate is a nominal uplink transmission rate on the E-DPDCH. The flow of control goes to step 214.

In an embodiment, the UE monitors the past n power control commands received from B1 and B2 where n is a positive integer in step 214. In an embodiment, the number n of PC commands to be monitored is configurable by B1 and sent from B1 to the UE. In an embodiment, the number n is a parameter indicating the number of PC commands from each node to be monitored by the UE. The flow of control goes to step 216.

In step 216, the UE determines the difference between the PC commands received from different nodes. The UE determines the difference between the PC commands received from B1 and the PC commands received from B2. The difference between the PC commands is an indication of the difference between the received SNRs at the respective cells, i.e., the difference between the received SNR at B1 and the received SNR at B2.

For example, in an embodiment, DOWN PC commands can be represented by −1 and UP PC commands can be represented by +1. If the number n=3, then three PC commands will be monitored from B1 and three PC commands will be monitored from B2. It would be apparent to those skilled in the art that the last three PC commands could be monitored, the last three sampled PC commands could be monitored, or other techniques known in the art can be used to select the particular PC commands to be monitored.

Continuing with the example, if the monitored PC commands from B1 are UP, UP, and DOWN, then the PC commands from B1 are represented by PC values +1, +1, and −1. Likewise, if the monitored PC commands from B2 are DOWN, DOWN, and UP, then the PC commands from B2 are represented by PC values −1, −1, and +1.

In an embodiment, the PC values for each node are summed and the difference between the sums, $\Delta$, is determined.

$B1: +1+1-1=+1$ $B2: -1-1+1=-1$

---

$\Delta=+2$

It would be apparent to those skilled in the art that other techniques known in the art may be used to determine the difference between PC commands. From step 216, the flow of control goes to step 218.

In step 218, an uplink transmission rate is selected based on the nominal uplink transmission rate and the difference between PC commands. In an embodiment, a positive difference $\Delta$ indicates that the uplink pilot SNR at B2 is greater than the uplink pilot SNR at B1; therefore, the UE selects an uplink transmission rate that is a reduction from the nominal uplink transmission rate. In an embodiment, a negative difference $\Delta$ indicates that the uplink pilot SNR at B2 is less than the uplink pilot SNR at B1; therefore, the UE selects an uplink transmission rate that is an increase from the nominal uplink transmission rate.

In an embodiment, $\Delta$ is mapped/translated into a $\Delta$ gain value based on the magnitude of power control command steps. For example, a $\Delta=2$ may translate into a negative 1 dB gain, a $\Delta=3$ may translate into a negative 1.5 dB gain, and a $\Delta=4$ may translate into a negative 2 dB gain.

In an embodiment, the amount of change between the selected uplink transmission rate and the nominal uplink transmission rate is based on the magnitude of the $\Delta$ gain value.

For illustration, table 1 shows a partial table of the Reverse Link Nominal Attribute Gain Table for the Physical Layer Standard for cdma2000 Spread Spectrum Systems, Release C, TIA/EIA/IS-2000.2-C, May 2002.

TABLE 1

| Data Rate (bps) | Nominal Attribute Gain (dB) | Target Error Rate |
|---|---|---|
| 1,200 | −7 | 0.05 |
| 1,350 | −6.75 | 0.05 |
| 1,500 | −6 | 0.01 |
| 1,800 | −5.25 | 0.01 |
| 1,800 | −5.7 | 0.05 |
| 2,400 | −3.75 | 0.05 |
| 2,700 | −2.75 | 0.01 |
| 3,600 | −1.63 | 0.01 |
| 3,600 | −2.13 | 0.05 |
| 4,800 | −.25 | 0.01 |
| 4,800 | −.38 | 0.05 |
| 7,200 | 1.9 | 0.01 |
| 7,200 | 1.25 | 0.05 |
| 9,600 | 3.75 | 0.01 |
| 9,600 | 3 | 0.05 |

Given table 1, a nominal uplink transmission rate of 2,400 bits per second (bps), and a $\Delta$ gain value of negative 1 dB gain, then an uplink transmission rate of 2,700 bps is selected.

From step 218, the flow of control goes to step 220. In step 220, a test is made to determine whether the selected uplink transmission rate is greater than the available uplink transmission capacity. In an embodiment, there is an uplink transmission capacity to the serving node and the serving node transmits an indication of its uplink transmission capacity that it has available for the UE to the UE. Thus, if the selected uplink transmission rate exceeds the available uplink transmission capacity, then in step 222, the UE selects the highest uplink transmission rate that is within the available uplink transmission capacity, otherwise the flow of control goes to step 224. From step 222, the flow of control goes to step 224. In step 224, the UE transmits uplink data at the selected uplink transmission rate.

Thus, the UE selects an uplink transmission rate not based on the actual SNR of the node having the best uplink transmission SNR, but based on a nominal uplink transmission rate and the difference between power control commands from the serving node and the node having the best uplink SNR.

Figure 3:
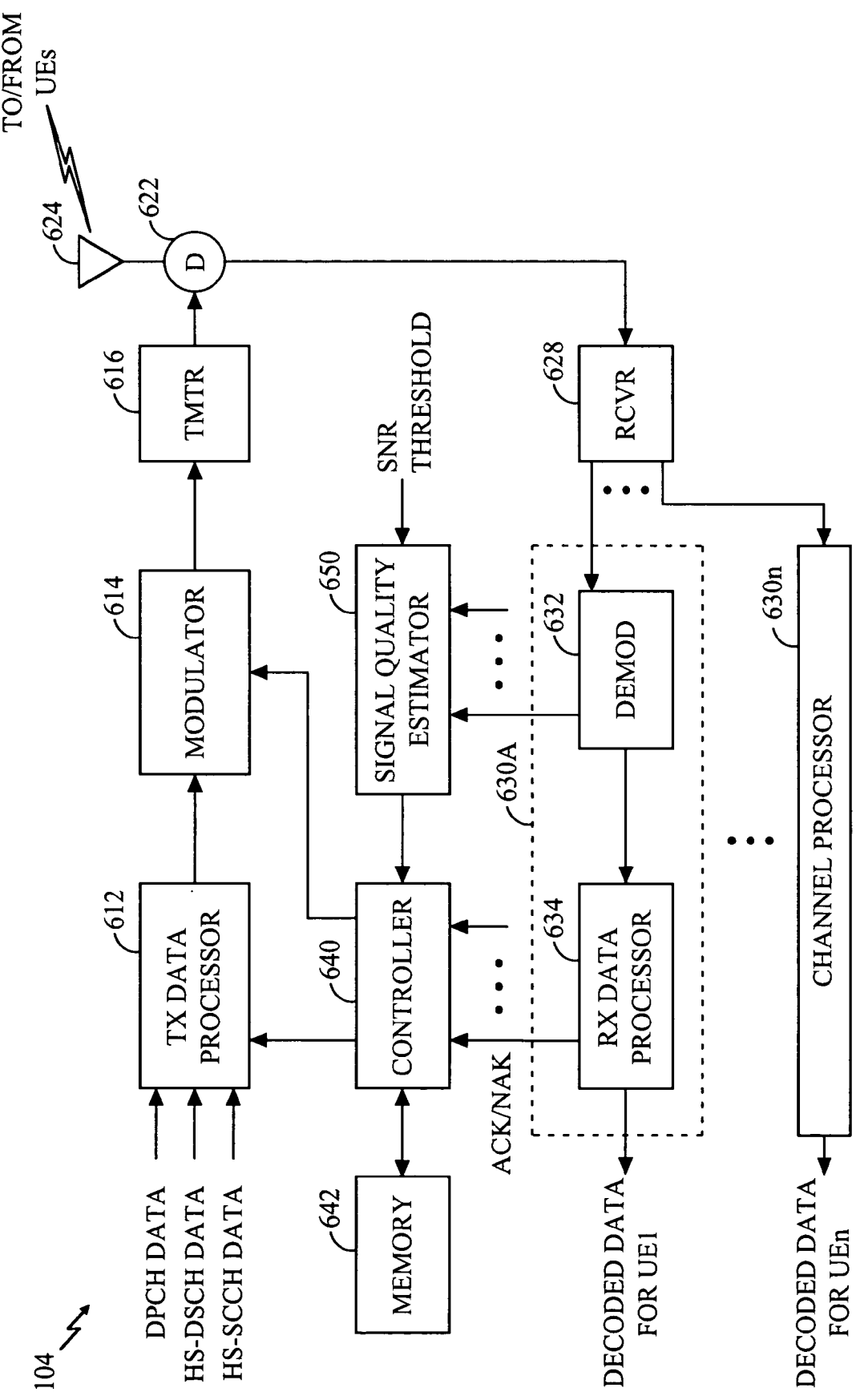
FIG. 3 is a block diagram of a Node B in accordance with an embodiment.

FIG. 3 is a block diagram of a Node B 104 in accordance with an embodiment. On the downlink, data for the downlink DPCH, HS-DSCH, and HS-SCCH for each UE designated to receive HSDPA transmission is received and processed (e.g., formatted, encoded, and so on) by a transmit (TX) data processor 612. The processing for each channel is determined by the set of parameters associated with that channel, and in an embodiment, may be performed as described by the W-CDMA standard documents. The processed data is then provided to a modulator (MOD) 614 and further processed (e.g., channelized, scrambled, and so on) to provide modulated data. A transmitter (TMTR) unit 616 then converts the modulated data into one or more analog signals, which are further conditions (e.g., amplifies, filters, and frequency upconverts) to provide a downlink signal. The downlink signal is routed through a duplexer (D) 622 and transmitted via an antenna 624 to the designated UE(s).

Figure 4:
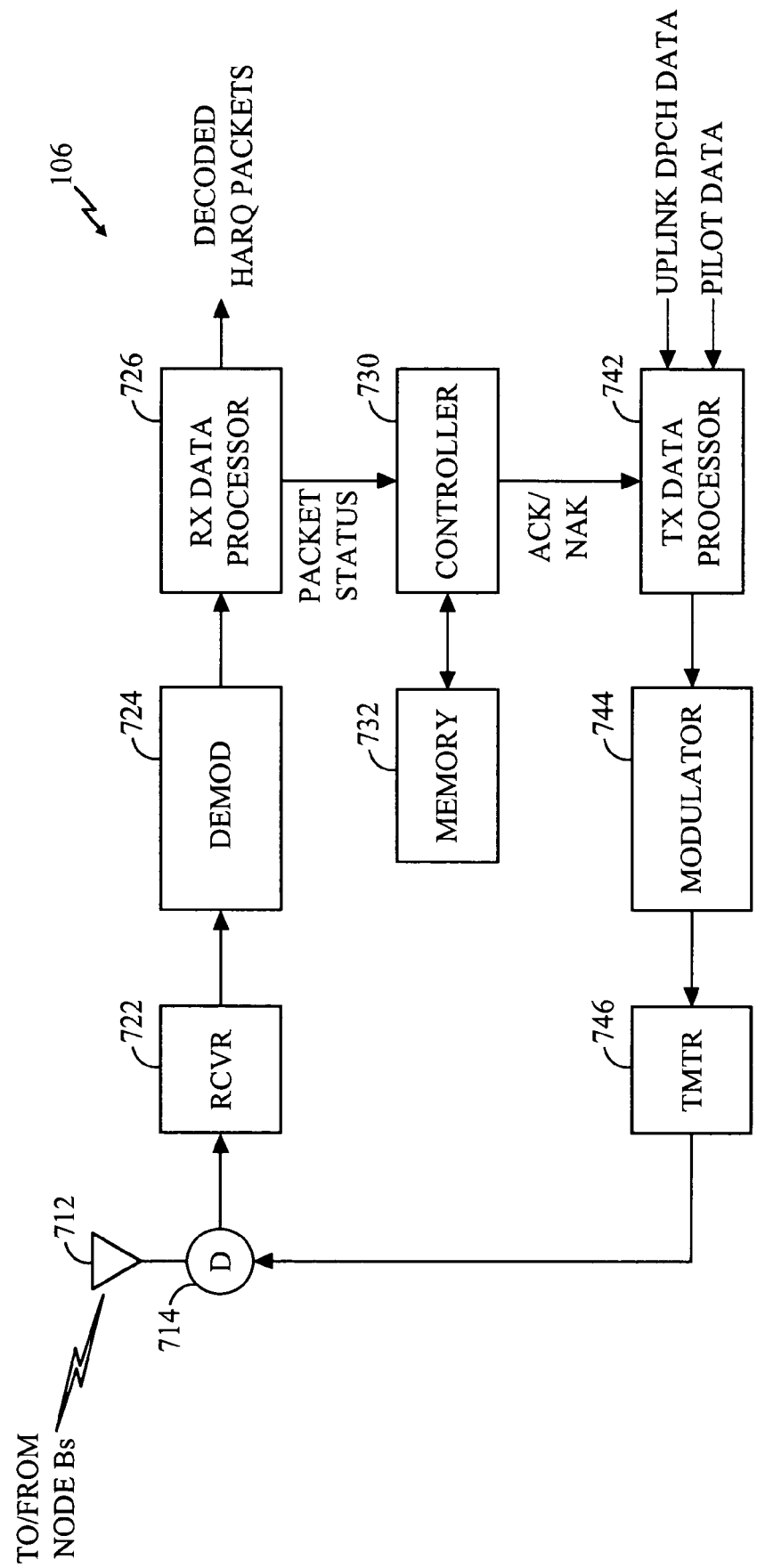
FIG. 4 is a block diagram of a UE in accordance with an embodiment.

FIG. 4 is a block diagram of a UE 106 in accordance with an embodiment. The downlink signal is received by an antenna 712, routed through a duplexer 714, and provided to a receiver (RCVR) unit 722. Receiver unit 722 conditions (e.g., filters, amplifies, and frequency downconverts) the received signal and further digitizes the conditioned signal to provide samples. A demodulator 724 then receives and processes (e.g., descrambles, channelizes, and data demodulates) the samples to provide symbols. Demodulator 724 may implement a rake receiver that can process multiple instances (or multipath components) of the received signal and provide combined symbols. A receive (RX) data processor 726 then decodes the symbols, checks the received packets, and provides the decoded packets. The processing by demodulator 724 and RX data processor 726 is complementary to the processing by modulator 614 and TX data processor 612, respectively.

On the uplink, data for the uplink DPCH, pilot data, and feedback information are processed (e.g., formatted, encoded, and so on) by a transmit (TX) data processor 742, further processed (e.g., channelized, scrambled, and so on) by a modulator (MOD) 744, and conditioned (e.g., converted to analog signals, amplified, filtered, and frequency upconverted) by a transmitter unit 746 to provide an uplink signal. The data processing for the uplink is described by the W-CDMA standard documents. The uplink signal is routed through duplexer 714 and transmitted via antenna 712 to one or more Node Bs 104.

Referring back to FIG. 3, at Node B 104, the uplink signal is received by antenna 624, routed through duplexer 622, and provided to a receiver unit 628. Receiver unit 628 conditions (e.g., frequency downconverts, filters, and amplifies) the received signal and further digitizes the conditioned signal to provide a stream of samples.

In the embodiment shown in FIG. 3, node B 104 includes a number of channel processors 630a through 630n. Each channel processor 630 may be assigned to process the sample steam for one UE to recover the data and feedback information transmitted on the uplink by the assigned UE. Each channel processor 630 includes a (1) demodulator 632 that processes (e.g., descrambles, channelizes, and so on) the samples to provide symbols, and (2) a RX data processor 634 that further processes the symbols to provide the decoded data for the assigned UE.

In an embodiment, the pilot symbols received from the UEs are provided by demodulator 632 to a signal quality estimator 650, which estimates the SNR of the transmissions on the uplink DPCH. The SNR for a given channel can be estimated using various techniques, such as those described in U.S. Pat. Nos. 6,097,972, 5,903,554, 5,056,109, and 5,265,119.

For each UE designated to receive HSDPA transmission, the received SNR for the uplink DPCH is compared against an SNR threshold. The same SNR threshold may be used for all UEs, or different SNR thresholds may be used for each UE. For each UE, signal quality estimator 650 compares the received SNR to the SNR threshold. For each UE, if the received SNR is better than the SNR threshold, then a message indicating an uplink transmission rate based on the received SNR is created and sent to the UE.

Controllers 640 and 730 control the processing at the Node B and the UE, respectively. Each controller may also be designed to implement all or a portion of the process to mitigate link imbalance. Program codes and data required by controllers 640 and 730 may be stored in memory units 642 and 732, respectively.

For simplicity, specific implementation details have been described for the mitigation of link imbalance. In particular, the determination of whether or not a UE is potentially experiencing link imbalance is based on the uplink received SNR and the SNR threshold. This determination may also be made using other criterion, and this is within the scope of the invention. For example, this determination may also be made based on (1) the received power of the uplink pilot (Ec), (2) the BLER for the uplink DPCH, and so on.

Also for simplicity, a specific 3-way handshake scheme was described to check the reliability of the uplink when it is determined that link imbalance may exist for a given UE. Other schemes to check the reliability of the uplink may also be implemented, and this is within the scope of the invention. For example, any of the information received on the uplink HS-DPCCH may be resent on the downlink (e.g., on the HS-DSCH) to the UE.

Although the techniques for mitigating deleterious effects due to link imbalance have been specifically described for the uplink, these techniques may also be applied for the downlink. These techniques may also be used for other CDMA systems (e.g., IS-2000) and other types of communication systems (e.g., TDMA and FDMA systems).

The techniques for mitigating the deleterious effects of link imbalance described herein may be implemented by various means. For example, these techniques may be implemented in hardware, software, or a combination thereof. For a hardware implementation, the elements used to implement any one or a combination of the techniques (e.g., the elements that implement the processes shown in FIGS. 4 and 5 at the Node B and the UE) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, these techniques may be implemented with modules (e.g., procedures, functions, and so on) that perform the functions described herein. The software codes may be stored in a memory unit (e.g., memory units 642 and 732 in FIGS. 3 and 4, respectively) and executed by a processor (e.g., controllers 640 and 730). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of selecting an uplink transmission rate in a wireless communications system, comprising:
   receiving a nominal uplink transmission rate;
   determining a difference value based on a first set of power control commands from a first station and a second set of power control commands from a second station; and
   selecting an uplink transmission rate based on the nominal uplink transmission rate and the difference value.

2. The method of claim 1, wherein the length of the first set of power control commands and the length of the second set of power control commands are n.

3. The method of claim 1, wherein the first set of power control commands is from a serving node and a second set of power control commands is from a node having a best uplink transmission signal-to-noise-and-interference ratio (SNR).

4. The method of claim 1, wherein the difference value is determined by:
   assigning a power control value to each power control command in the first set of power control commands and assigning a power control value to each power control command in the second set of power control commands;
   summing the power control values of the first set of power control values, creating a first sum;
   summing the power control values of the second set of power control values, creating a second sum; and
   calculating the difference between the first sum and the second sum.

5. The method of claim 4, further comprising translating the difference between the first sum and the second sum into a difference gain value.

6. A terminal in a wireless communications system, comprising:
   an antenna;
   a receiver receiving a nominal uplink transmission rate via the antenna;
   a processing unit determining a difference value based on a first set of power control commands from a first station and a second set of power control commands from a second station; and
   a processing unit selecting an uplink transmission rate based on the nominal uplink transmission rate and the difference value.

7. The terminal of claim 6, further comprising a receiver receiving the first set of power control commands from a serving node and receiving the second set of power control commands from a node having a best uplink transmission SNR.

8. A computer-readable medium storing codes thereon for selecting an uplink transmission rate in a wireless communications system, the codes being executable to:
   determine a difference value based on a first set of power control commands from a first station and a second set of power control commands from a second station; and
   select an uplink transmission rate based on the nominal uplink transmission rate and the difference value.

9. An apparatus in a wireless communications system, comprising:
   a receiver capable of receiving a nominal uplink transmission rate;
   a processing unit capable of determining a difference value based on a first set of power control commands from a first station and a second set of power control commands from a second station; and
   a processing unit capable of selecting an uplink transmission rate based on the nominal uplink transmission rate and the difference value.

10. The apparatus of claim 9, wherein the length of the first set of power control commands and the length of the second set of power control commands are n.

11. The apparatus of claim 9, wherein the first set of power control commands is from a serving node and a second set of power control commands is from a node having a best uplink transmission signal-to-noise-and-interference ratio (SNR).

12. The apparatus of claim 9, wherein the processing unit capable of determining a difference value is further capable of:
   assigning a power control value to each power control command in the first set of power control commands and assigning a power control value to each power control command in the second set of power control commands;
   summing the power control values of the first set of power control values, creating a first sum;
   summing the power control values of the second set of power control values, creating a second sum; and
   calculating the difference between the first sum and the second sum.

13. The apparatus of claim 12, further comprising a processing unit capable of translating the difference between the first sum and the second sum into a difference gain value.

14. An apparatus in a wireless communications system, comprising:
   means for receiving a nominal uplink transmission rate;
   means for determining a difference value based on a first set of power control commands from a first station and a second set of power control commands from a second station; and
   means for selecting an uplink transmission rate based on the nominal uplink transmission rate and the difference value.

15. The apparatus of claim 14, wherein the length of the first set of power control commands and the length of the second set of power control commands are n.

16. The apparatus of claim 14, wherein the first set of power control commands is from a serving node and a second set of power control commands is from a node having a best uplink transmission signal-to-noise-and-interference ratio (SNR).

17. The apparatus of claim 14, further comprising:
   means for assigning a power control value to each power control command in the first set of power control commands and assigning a power control value to each power control command in the second set of power control commands;
   means for summing the power control values of the first set of power control values, creating a first sum;
   means for summing the power control values of the second set of power control values, creating a second sum; and
   means for calculating the difference between the first sum and the second sum.

18. The apparatus of claim 17, further comprising means for translating the difference between the first sum and the second sum into a difference gain value.

19. The method of claim 1, wherein at least one of the first and second stations is a base station.

20. The terminal of claim 6, wherein at least one of the first and second stations is a base station.

21. The computer-readable medium of claim 8, wherein at least one of the first and second stations is a base station.

22. The apparatus of claim 9, wherein at least one of the first and second stations is a base station.

23. The apparatus of claim 14, wherein at least one of the first and second stations is a base station.

* * * * *

UNITED STATES PATENT AND TRADEMARK OFFICE
CERTIFICATE OF CORRECTION

PATENT NO. : 7,493,132 B2
APPLICATION NO. : 10/367498
DATED : February 17, 2009
INVENTOR(S) : Malladi et al.

It is certified that error appears in the above-identified patent and that said Letters Patent is hereby corrected as shown below:

Column 11, line 50, claim 7: "SNR" to read as --signal-to-noise-and-interference ratio (SNR)--

Signed and Sealed this
Third Day of April, 2012

David J. Kappos
*Director of the United States Patent and Trademark Office*